United States Patent
Koch et al.

(10) Patent No.: US 12,008,715 B2
(45) Date of Patent: Jun. 11, 2024

(54) DETERMINING DRAINAGE CONSTRAINTS AND GEOMETRIES IN A TRIANGULAR MESH

(71) Applicant: Autodesk, Inc., San Rafael, CA (US)

(72) Inventors: Valentin R. Koch, Kelowna (CA); Weiwei Hu, Shanghai (CN)

(73) Assignee: AUTODESK, INC., San Francisco, CA (US)

( * ) Notice: Subject to any disclaimer, the term of this patent is extended or adjusted under 35 U.S.C. 154(b) by 236 days.

(21) Appl. No.: 17/682,891

(22) Filed: Feb. 28, 2022

(65) Prior Publication Data
US 2023/0274501 A1    Aug. 31, 2023

(51) Int. Cl.
G06T 17/20    (2006.01)
G06F 30/13    (2020.01)
G06T 17/05    (2011.01)
G06T 19/20    (2011.01)
G06F 111/04    (2020.01)

(52) U.S. Cl.
CPC .............. G06T 17/20 (2013.01); G06F 30/13 (2020.01); G06T 17/05 (2013.01); G06T 19/20 (2013.01); G06F 2111/04 (2020.01); G06T 2219/2021 (2013.01)

(58) Field of Classification Search
None
See application file for complete search history.

(56) References Cited

U.S. PATENT DOCUMENTS

| | | |
|---|---|---|
| 10,915,670 B2 | 2/2021 | Koch et al. |
| 11,308,251 B2 | 4/2022 | Koch et al. |
| 2018/0075169 A1* | 3/2018 | Koch ............. A01B 79/005 |
| 2021/0141966 A1 | 5/2021 | Koch et al. |

OTHER PUBLICATIONS

Fowler et al., "Automatic Extraction of Irregular Network Digital Terrain Models", Aug. 1979, Proceedings of the 6th annual conference on Computer graphics and interactive techniques, pp. 199-207 (Year: 1979).*

Collon et al., "3D geomodelling combining implicit surfaces and Voronoi-based remeshing: A case study in the Lorraine Coal Basin (France)", Jan. 16, 2015, Elsevier, vol. 77, pp. 29-43 (Year: 2015).*

(Continued)

Primary Examiner — Kent W Chang
Assistant Examiner — Jonathan M Cofino
(74) Attorney, Agent, or Firm — Gates & Cooper LLP

(57) ABSTRACT

A method and system provide the ability to design a terrain surface. A triangular surface mesh representative of an existing surface is obtained and consists of triangles that are connected by vertices and edges. A drain intention is specified for the terrain surface through a geometry that is a point or line. The drain intention defines a drainage flow that influences a shape of the terrain surface. The mesh is modified using a Voronoi diagram that prevents a drain conflict between mesh triangles. A drain direction is autonomously determined a for each of the mesh triangles based on the drain intention. The determination generates a drain pattern that is used to shape the terrain surface.

20 Claims, 9 Drawing Sheets

(56) References Cited

OTHER PUBLICATIONS

Cuevas, "Characterization and Modelling of Hydrological Processes in Peri-Urban Catchments Located in the Piedmont of Santiago (Chile)", 2018, Pontificia Universidad Catolica de Chile, Dissertation (Year: 2018).*
Sanzana et al., "Decomposition of 2D polygons and its effect in hydrological models", Jan. 2019, IWA Publishing, vol. 21, No. 1, pp. 104-122 (Year: 2019).*
"Voronoi diagram", Wikipedia, http://en.wikipedia.org/wiki/Voronoi_diagram, pp. 1-7, last edited Jan. 13, 2022.

* cited by examiner

DETERMINING DRAINAGE CONSTRAINTS AND GEOMETRIES IN A TRIANGULAR MESH

CROSS-REFERENCE TO RELATED APPLICATIONS

This application is related to the following co-pending and commonly-assigned patent application, which application is incorporated by reference herein:

U.S. patent application Ser. No. 17/096,421, filed on Nov. 12, 2020, which issued Nov. 14, 2023 as U.S. Pat. No. 11,816,396 with inventor(s) Valentin R. Koch, Patrick A. Bergeron, Nicholas James Zeeben, Qing Xue, and Weiwei Hu, entitled "Constraint Based Automatic Terrain Surface Design", which application claims the benefit under 35 U.S.C. 119(e) of commonly assigned Provisional Application Ser. No. 62/934,817, filed on Nov. 13, 2019, with inventor(s) Valentin R. Koch, Patrick A. Bergeron, Nicholas James Zeeben, Qing Xue, and Weiwei Hu, entitled "Constraint Based Automatic Terrain Surface Design";

U.S. patent application Ser. No. 16/906,856, filed on Jun. 16, 2020, which issued Apr. 19, 2022 as U.S. Pat. No. 11,308,251 with inventor(s) Valentin R. Koch and Hung M. Phan, entitled "Method and System for Minimizing Earthwork Volumes", which application claims the benefit under 35 U.S.C. 119(e) of commonly assigned Provisional Application Ser. No. 62/864,830, filed on Jun. 21, 2019, with inventor(s) Valentin R. Koch and Hung M. Phan, entitled "Proximity Operator to Minimize Earthwork Volumes," and U.S. patent application Ser. No. 15/705,083, filed on Sep. 14, 2017, now U.S. Pat. No. 10,915,670 issued on Feb. 9, 2021, with inventor(s) Valentin R. Koch and Hung M. Phan, entitled "Spatial Constraint Based Triangular Mesh Operations in Three Dimensions," which application claims the benefit under 35 U.S.C. Section 119(e) of commonly-assigned Provisional Application Ser. No. 62/394,608, filed on Sep. 14, 2016, with inventor(s) Valentin R. Koch and Hung M. Phan, entitled "Applying Geometric Constraints on Triangles in Three Dimensions," both of which are incorporated by reference herein.

BACKGROUND OF THE INVENTION

1. Field of the Invention

The present invention relates generally to terrain surface design, and in particular, to a method, apparatus, system, and article of manufacture for optimizing the drainage design for a terrain surface.

2. Description of the Related Art

Grading optimization is a generative design approach to create grading designs for terrains around buildings, parking lots, structures, and roads. Generally, a triangular mesh is used to represent the terrain of existing and final ground. The final ground designs are often based on drainage requirements. Water needs to flow to certain inlet locations in parking lots or roads, or it should drain in a certain direction towards a drain channel or pond area.

Existing grading optimization tools let users place a drain direction on polygonal areas, to have the full area drain in the same direction. Cross-referenced above U.S. patent application Ser. No. 17/096,421 (descriptive of the AUTODESK GRADING OPTIMIZATION (GO) software product) describes new tools such as drain lines, low points, or ridge lines, to communicate the drain intent of the user to the software. These tools are used to determine the drain direction of each triangle on a surface mesh. Complex designs that involve multiple low points, drain lines, and ridge lines, can quickly create conflicting direction settings on neighboring triangles on the surface. Conflicting drain directions result in grading designs that cannot be generated.

In prior art grading optimization systems, a large number of grading designs were not feasible due to conflicting drain directions. For example, a user had to detect the conflicts and then manually change the drain lines, low points, ridge lines, or change the triangle mesh so that no conflicts would happen. This led to an unreasonable amount of user interaction, and worse, would make it impossible to design certain drainage schemes.

Other prior art systems (e.g., BENTLEY'S SITEOPS, OPENSITE DESIGN or OPENRAODS) may utilize a generate grading solution but are limited in their flexibility and design options. For example, such prior art systems may allow a user to define a drain direction for an entire zone but does not permit the user to communicate drain intent in a different manner (other than a single direction for every triangle in a zone). For example, such prior art systems fail to provide the ability/functionality to utilize other drain elements such as drain lines, low points, ridge lines, or similar. Such a lack of functionality illustrates that the prior art fails to utilize the shortest distance to a drain element that is represented by a geometry (e.g., as provided by embodiments of the present invention), and consequently, never solves the problem that would arise out of conflicting drain directions that result from a shortest distance method.

In view of the above, what is needed is a method and system that optimizes the drainage design of a terrain in an efficient and solvable manner while allowing users to specify constraints within such a design.

SUMMARY OF THE INVENTION

While prior art solutions may only allow sloping of entire zones in a specific direction, embodiments of the invention enable users to design complex and precise drainage patterns with new tools such as low points, drain lines, and ridge lines. Embodiments of the invention provide such capabilities through the use of a "closest drain element" method, advanced Voronoi diagrams and surface break lines, as well as exclusive drainage zones and zone hierarchies. In this regard, embodiments of the invention utilize an advanced Voronoi diagram to automatically modify a triangular surface mesh around drain lines, low points, or ridge lines, in which conflicting drain directions are automatically removed.

BRIEF DESCRIPTION OF THE DRAWINGS

Referring now to the drawings in which like reference numbers represent corresponding parts throughout.

DETAILED DESCRIPTION OF THE INVENTION

In the following description, reference is made to the accompanying drawings which form a part hereof, and which is shown, by way of illustration, several embodiments of the present invention. It is understood that other embodiments may be utilized and structural changes may be made without departing from the scope of the present invention.
Drain Direction/Intent Design In embodiments of the invention, the user has multiple ways to communicate the drain intent.
(1) Low or high points are points on the surface that create a circular or diamond shape drain pattern towards or away from the point.
(2) Drain or ridge lines create drain patterns that are perpendicular along a line segment, and circular around the ends of a polyline, either towards or away from the line.
(3) Zone directions are uniform drain directions that are assigned to triangles within a zone that is defined by a closed polygon.

The first two drain elements above are based on points and polylines. These points or lines are used to determine the drain direction of a triangle on the mesh surface. In embodiments of the invention, the drain direction of a triangle is towards the closest drain line, low point, or ridge line on the surface.

Figure 1:
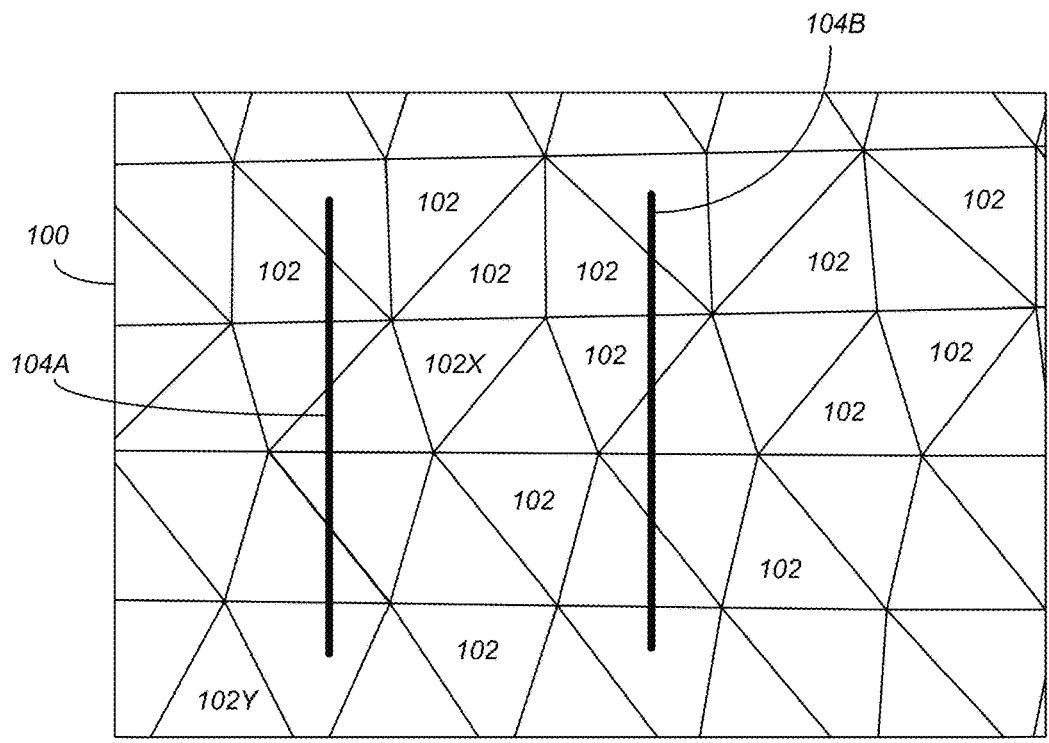
FIG. 1 illustrates a mesh surface comprised of multiple triangles in accordance with one or more embodiments of the invention.

Problems can arise when triangles lie right in the middle between drain lines. FIG. 1 illustrates a mesh surface 100 comprised of multiple triangles 102 (not all triangles 102 are labeled in FIG. 1). The user has inserted/drawn two parallel drain lines 104A and 104B (referred to collectively as drain lines 104). The drain lines 104 (and/or other drain elements) are used to tell terrain triangles 102 where they should incline themselves. Users can add drain lines 104 in any area and can specify low points (or other drain elements) as desired.

Figure 2:
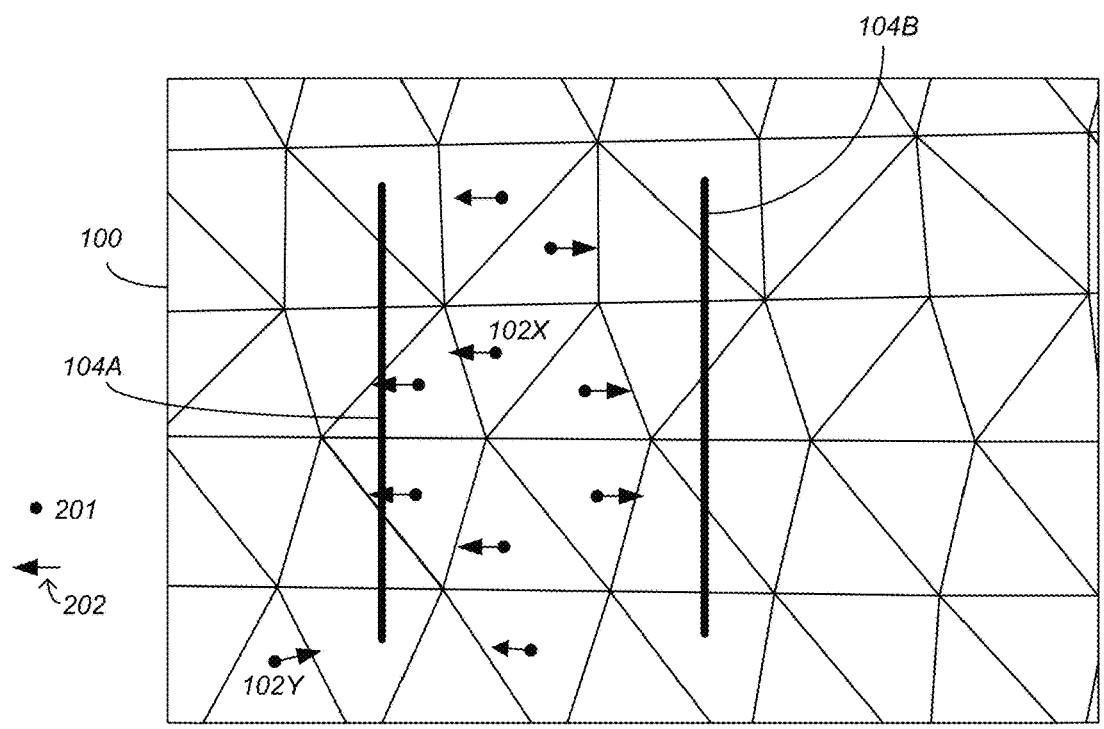
FIG. 2 illustrates drain directions for mesh triangles in accordance with one or more embodiments of the invention.

The next step is to determine the drain direction of each triangle 102. The centroid of each triangle 102 is used to measure the distance to each drain line/element 104. For example, the centroid of a first triangle 102X that lies between the two drain lines 104A and 104B is used to measure the distance to each drain line 104A and 104B. Referring to FIG. 2, as the centroid 201 of first triangle 102X is closer to drain line 104A, its drain direction 202 (illustrated by arrows) for the grading optimization is therefore set to be towards drain line 104A. Accordingly, FIG. 2 illustrates the drain directions 202 for various mesh triangles 102 in accordance with one or more embodiments of the invention.

Figure 3:
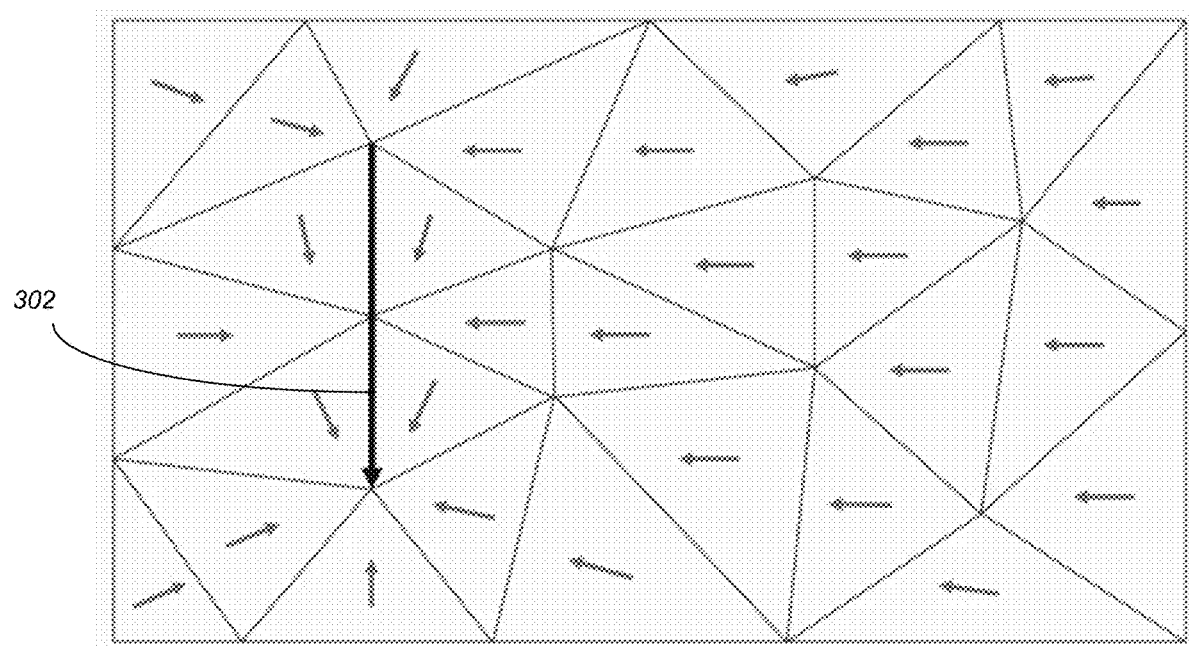
FIG. 3 illustrates an exemplary mesh surface with a single drain line with drain directions that have been assigned in accordance with one or more embodiments of the invention.
Figure 4:
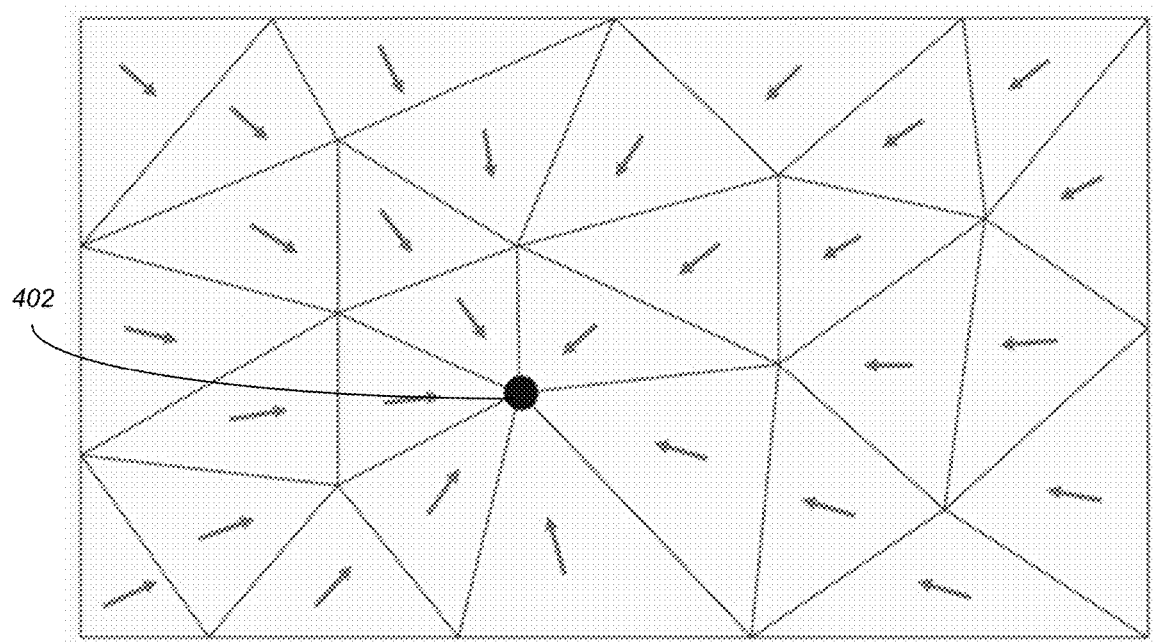
FIG. 4 illustrates an exemplary mesh surface with a single drain element inlet with drain directions that have been assigned in accordance with one or more embodiments of the invention.

In one or more embodiments, the drain direction is perpendicular from the centroid 201 to the drain line/element 104. However, if a centroid 201 extends beyond the end of the drain line/element 104 (e.g., as illustrated with respect to triangle 102Y), the drain direction will point towards the tip of the closest terminal of the drain line/element 104 (e.g., the head or tail of a drain line 104). Further, if a triangle 102 is adjacent to a drain line 104 (e.g., the triangle 102 has two vertices on the drain line 104), the drain direction 202 will point to the tip of the drain line 104 (so that the entire triangle is inclined/angled/tilted towards the tip of the drain line 104). FIG. 3 illustrates an exemplary mesh surface with a single drain line 302 with drain directions (indicated by arrows) that have been assigned in accordance with one or more embodiments of the invention. Similarly, FIG. 4 illustrates an exemplary mesh surface with a single drain element inlet 402 with drain directions (indicated by arrows) that have been assigned in accordance with one or more embodiments of the invention (centroids are not specifically illustrated).

Figure 5:
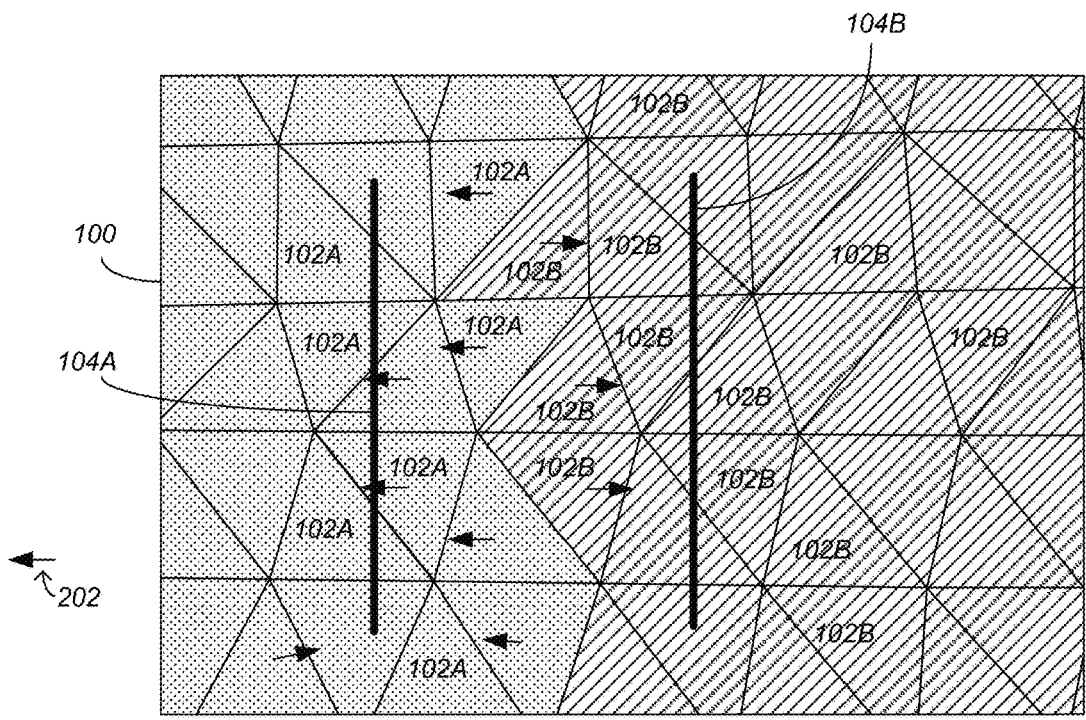
FIG. 5 illustrates mesh triangles that have drain directions towards multiple drain lines in accordance with one or more embodiments of the invention.

Continuing with the examples of FIGS. 1 and 2, FIG. 5 illustrates mesh triangles 102A that have drain directions towards drain line 104A and mesh triangles 102B that have drain directions towards drain line 104B in accordance with one or more embodiments of the invention. As illustrated, the first triangle 102A (i.e., bolded triangle) has three neighbor triangles with whom it shares its edges. The centroids of two of these neighboring triangles are both closer to drain line 104B (compared to drain line 104A), and the drain direction of these two neighbor triangles are therefore in an opposite direction to the drain direction of the first triangle. This creates an impossible design that an optimization algorithm cannot solve.

To solve the above design optimization problem, embodiments of the invention utilize advanced Voronoi diagrams. A Voronoi diagram is a partition of a plane into regions close to each of a given set of objects. In the simplest case, these objects are just finitely many points in the plane (called seeds, sites, or generators). For each seed there is a corresponding region, called a Voronoi cell, consisting of all points of the plane closer to that seed than to any other. For example, a Voronoi diagram may be created by expanding a region out from each seed until the region meets another expanding region. The result is a set of regions where each region is closest to the seed for that region than to any other seed. A description of Voronoi diagrams may be found at en.wikipedia.org/wiki/Voronoi_diagram, which is incorporated by reference herein.

In an "advanced" Voronoi diagram, the objects/seeds can be lines, polylines, or arcs. In the case of embodiments of the invention, points are used for low or high points, and polylines are used for drain lines, ridge lines, or zone boundaries. An advanced Voronoi diagram is created for the sets of all drain elements. To create the advanced Voronoi diagram, the polyline is split into several line segments, and the arc is tessellated into several small line segments. Therefore, the seeds of the advanced Voronoi diagram are line segments and points only. The advanced Voronoi diagram can be created by the same method as the Voronoi diagram, for example, expanding a region out from each seed until the region meets another expanding region. The result is a set of regions where each region is closest to the seed for that region than to any other seed. There is a post step after the advanced Voronoi diagram is created, which is to merge some of the neighbor Voronoi cells. The reason for the merge is because the polyline is split and the arc is tessellated so that the seeds are line segments and points only. The resulting advanced Voronoi cell that is acquired is the region that is closest to one seed than any others. However, the goal is to find the region that is closest to one drainage element than any others. Therefore, some neighbor Voronoi cells may need to be merged if their seeds are from the same drainage element. This merge operation can be done easily by tagging the drainage element id on every seed. The edge of a Voronoi cell may not only be a line segment, but may also be a parabola. To simplify the problem, the parabola can be tessellated into several small line segments, but such tessellation is not a necessary step in this invention. A final step that may be performed is to deal with an infinite Voronoi cell edge. For example, infinite Voronoi cell edges may be cut by the boundary of the grading limit so that all the Voronoi cell are closed and finite. Creating such a Voronoi diagram splits the surface model into several Voronoi regions, where each region contains one (or more) drain element and all the points of that region, including the triangle centroids, are closer to that drain element than to any other drain element on the surface.

A problem arises when the Voronoi cell boundaries do not coincide with the edges of the surface triangles. For example, two neighboring Voronoi cells may create a ridge along their common boundary. But if a triangle has its vertices on either side of the boundary, and hence crosses the boundary of the two cells, then no ridge can be created where that triangle is located. Hence, embodiments of the invention split the triangles along the Voronoi cell boundaries. In particular, embodiments of the invention make use of "breaklines" to modify the surface triangle mesh.

Figure 6:
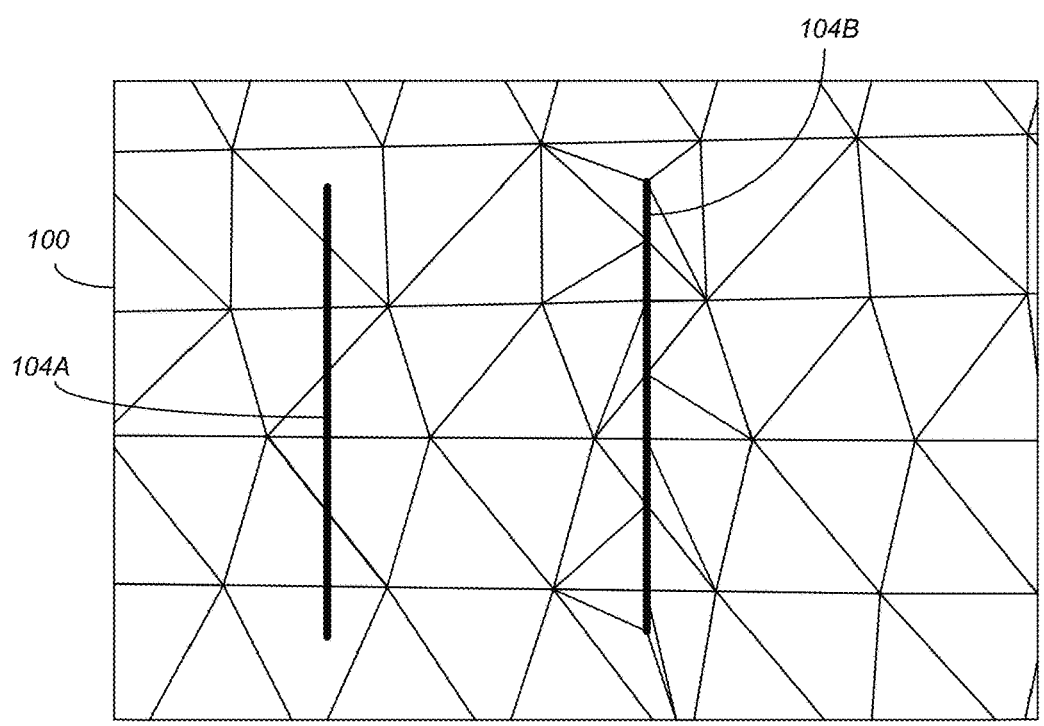
FIG. 6 illustrates the use of the drain line as a breakline in accordance with one or more embodiments of the invention.

In embodiments of the invention, a breakline feature may enable a user to add a polyline to the surface to act as a breakline. A breakline will cut the triangulation in the mesh along the given polyline, and interpolate the surface elevations from the existing surface mesh data. When a breakline is placed, new surface points are created at each vertex of the polyline, as well as at each intersection of a surface triangle edge and the polyline. The new points are then used to create new, additional surface triangles. Based on the mesh 100 of FIG. 1, FIG. 6 illustrates the use of the drain line as a breakline in accordance with one or more embodiments of the invention. As illustrated, the drain line 104B is used as a breakline where the drain line endpoints, as well as intersections with the prior triangle mesh 100, are utilized to create vertices for new surface triangles. The elevation for each new point is extracted from the original surface triangle, therefore maintaining the integrity of the original surface.

Figure 7:
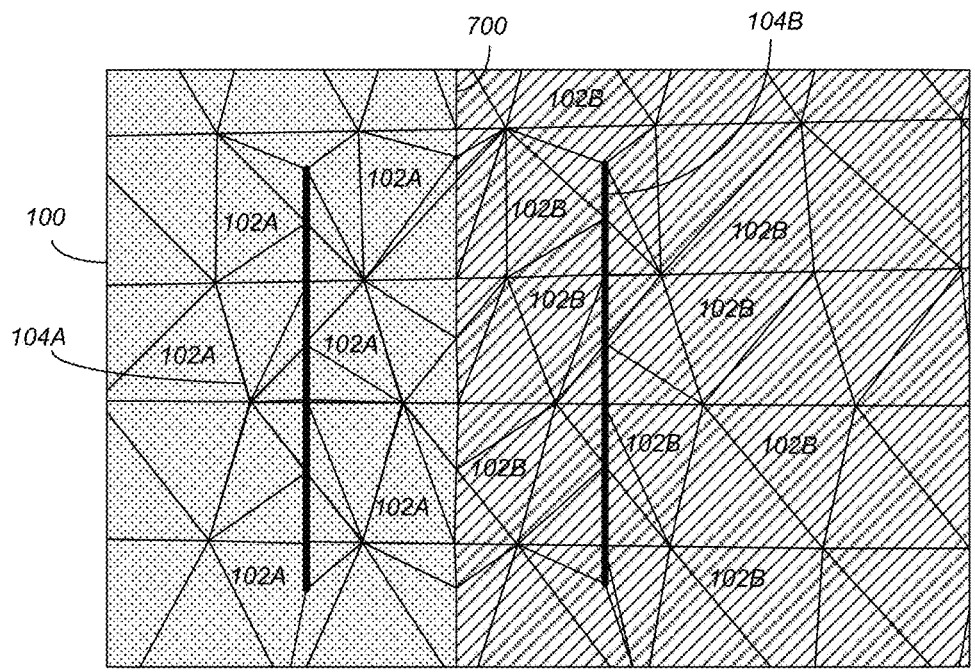
FIG. 7 illustrates how a border of Voronoi cell edges are utilized as breaklines in accordance with one or more embodiments of the invention.

Further to the use of the breaklines coincident with the drain line/elements, embodiments of the invention employ the use of Voronoi diagrams (as described above) to define breakline locations. Embodiments of the invention add the advanced Voronoi diagram cell edges as breaklines into the surface resulting in a surface triangle mesh that will be split nicely into cleanly separated regions, with clean ridges and valleys formed where the water flows towards the specific drain element that the region contains. FIG. 7 illustrates how the border/intersection 700 of the Voronoi cell edges are utilized as breaklines resulting in the creation/generation of additional triangles thereby cleanly separating the regions and triangles 102A with a drain direction towards drain line 104A and triangles 102B with a drain direction towards drain line 104B.

Exclusive Drainage Zone

Figure 8:
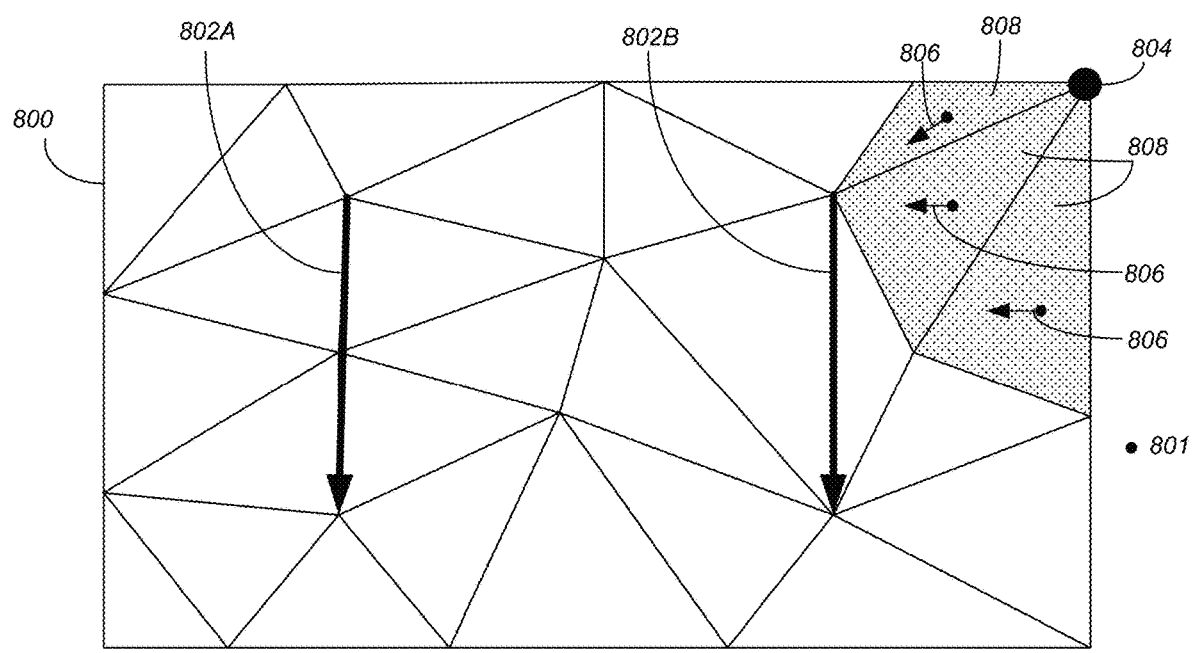
FIG. 8 illustrates an exemplary mesh surface with drain lines and a drain inlet in accordance with one or more embodiments of the invention.

In real world applications, users may want more control on the drain direction of the triangles 102 (rather than using the closest drain element method described above). As an example, consider a pond where a user wants to place a low point at the pond bottom that acts as a drain inlet of the pond, where water can evacuate (similar to the drain in a bathtub). With the closest drain element method, a triangle at the bottom of the pond may be closer to a drain line that is beside the pond, than the low point the user wants to use as a sink. FIG. 8 illustrates an exemplary mesh surface 800 with drain lines 802A-802B and a drain inlet 804. During normal processing of embodiments of the invention, by default, the drain directions 806 of the triangles 808 point towards the drain line 802B instead of the low point 804, because the distance of the centroid 801 (of triangles 808) to the drain line 802B is shorter than the distance to the low point 804, although the triangles 808 are connected to the low point 804. Such a result may be contrary to the user's intent.

Figure 9:
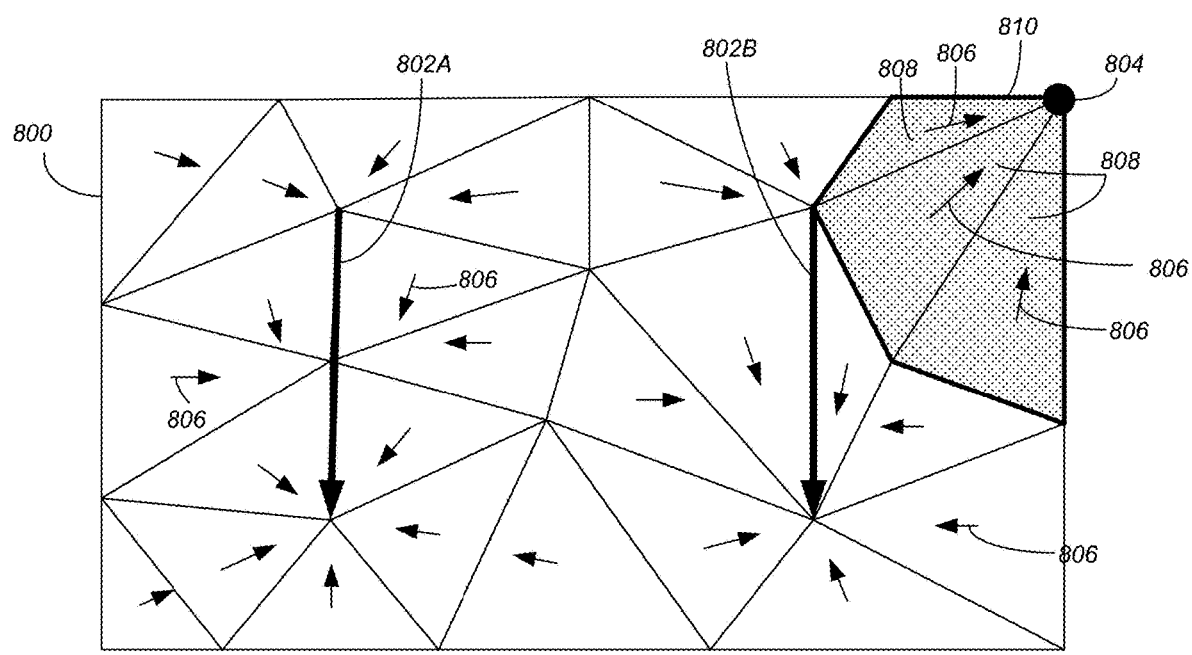
FIG. 9 illustrates the result of the creation of an exclusive drainage zone in accordance with one or more embodiments of the invention.

In embodiments of the invention, this problem is solved with the help of an "exclusive drainage zone". The exclusive drainage zone considers only drain elements (low points or drain lines) that are inside the zone. The processing disregards anything that is placed outside of the zone. Thus, in the simple case from FIG. 8, if an exclusive drainage zone 810 is created that covers triangles 808, then these triangles will see only the low point 804, without considering the drain line 802B outside that zone, and the processing sets the drain direction 806 of triangles 808 accordingly. FIG. 9 illustrates the result of the creation of an exclusive drainage zone covering triangles 808 of FIG. 8 in accordance with one or more embodiments of the invention. As illustrated the drain directions 808 of all the triangles are based on the distance from the centroid of each triangle to the closest drain element (i.e., drain line 802A, drain line 802B, or drain inlet 804) except for those triangles 806 within the designated exclusive drainage zone 810, which are constrained/restricted to seeing only drain inlet 804. In addition, in embodiments of the invention, if there are multiple drain elements within an exclusive drainage zone 810, the closest distance rule would apply within the exclusive drainage zone 810 (unless a zone hierarchy is established as described below).

One may also note that as illustrated in FIG. 9, as described above, the drain direction 806 is perpendicular from the centroid to the drain line 802A/802B. However, if a centroid extends beyond the end of the drain line 802A/802B, the drain direction will point towards the tip of the closest terminal of the drain line 802A/802B (e.g., the head or tail of drain line 802A/802B). Further, if a triangle is adjacent to a drain line 802A/802B (e.g., the triangle has two vertices on the drain line 802A/802B), the drain direction 808 will point to the tip of the drain line 802A/802B (so that the entire triangle is inclined/angled/tilted towards the tip of the drain line 802A/802B). Accordingly, rather than setting the same drain direction/angle 806 for every triangle 808 within a zone, embodiments of the invention enable the use of an exclusive drainage zone 810 where the triangles 808 within the zone 810 may each have independently defined drain directions 806 based on the drain elements (e.g., drain inlet 804) within the exclusive zone 810.

To allow the user to create more complex drain patterns, embodiments of the invention may also include a user definable zone hierarchy. Thereafter, every zone may be prioritized according to that hierarchy. If two zones overlap each other in the XY plane view, the settings of the higher priority zone override the settings of zones underneath in the hierarchy.

Figure 10:
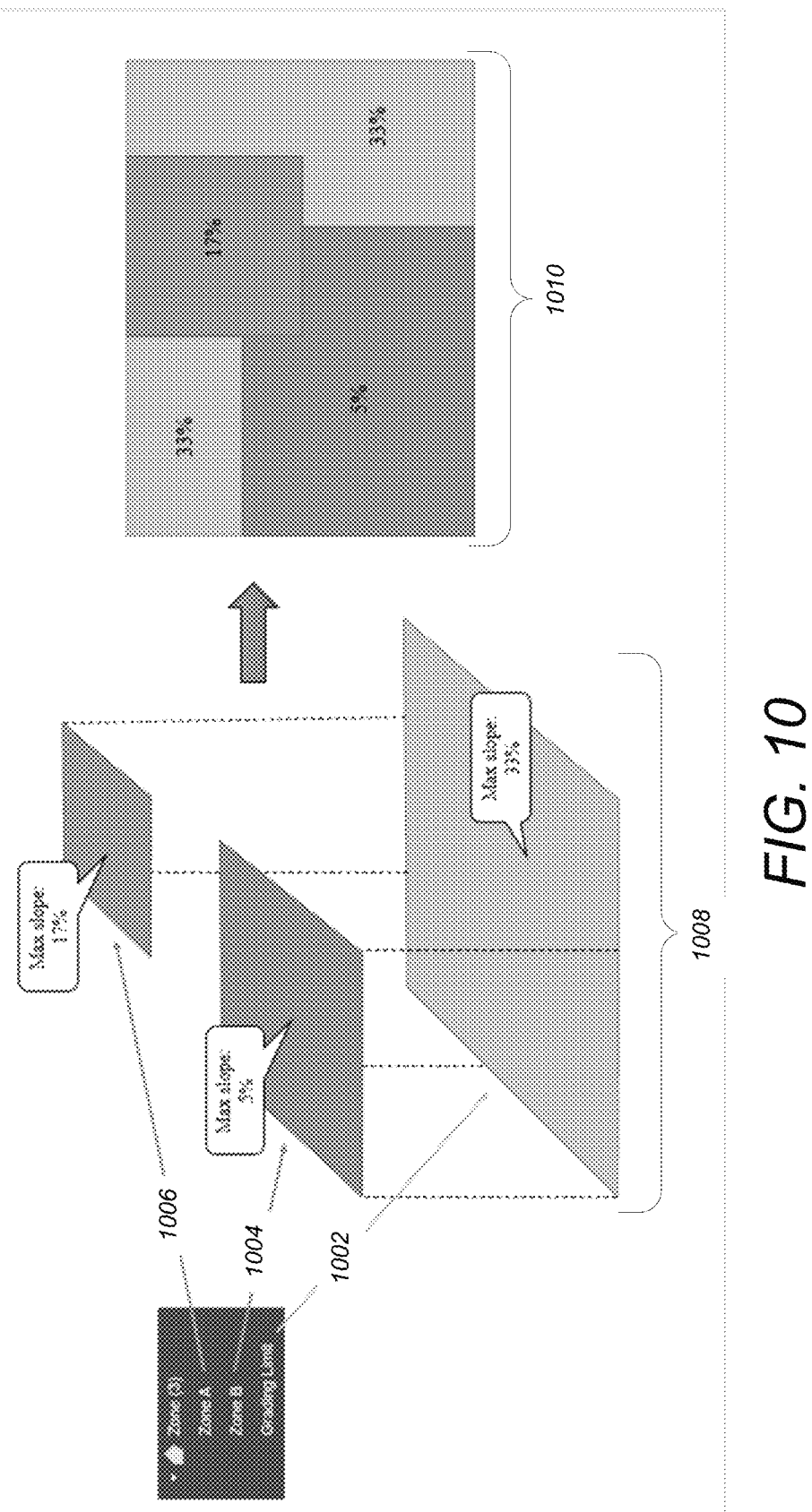
FIG. 10 illustrates an exemplary user definable zone hierarchy in accordance with one or more embodiments of the invention.

FIG. 10 illustrates an exemplary user definable zone hierarchy in accordance with one or more embodiments of the invention. To limit the region that the optimizer will consider during the optimization, embodiments of the invention create a Grading Limit zone 1002 with a max slope constraint of 33%. The user then places an exclusive drainage zone (i.e., Zone B 1004) with a max slope constraint of 5%. It may be desirable that a small region inside that exclusive drainage zone is allowed to exceed the maximum slope of 5%, but remain below 17%. The user can just add another zone A 1006 for this region with a max slope constraint setting of 17%, and make sure that the new zone is above the exclusive drainage zone in the hierarchy 1008. Area 1010 illustrates a two-dimensional (2D) view/graphical user interface of the hierarchy 1008 in which the user can move the zones 1002-1006 in front of or behind each other thereby defining the priorities/level of priority between the zones 1002-1006. Different user interfaces/methodologies may be utilized to define the priorities and establish the hierarchy 1008 and embodiments of the invention are not intended to be limited by any single methodology/user interface. Based on the zone hierarchy (and the zone priorities defined therein), the drain direction may be established.

Logical Flow

Figure 11:
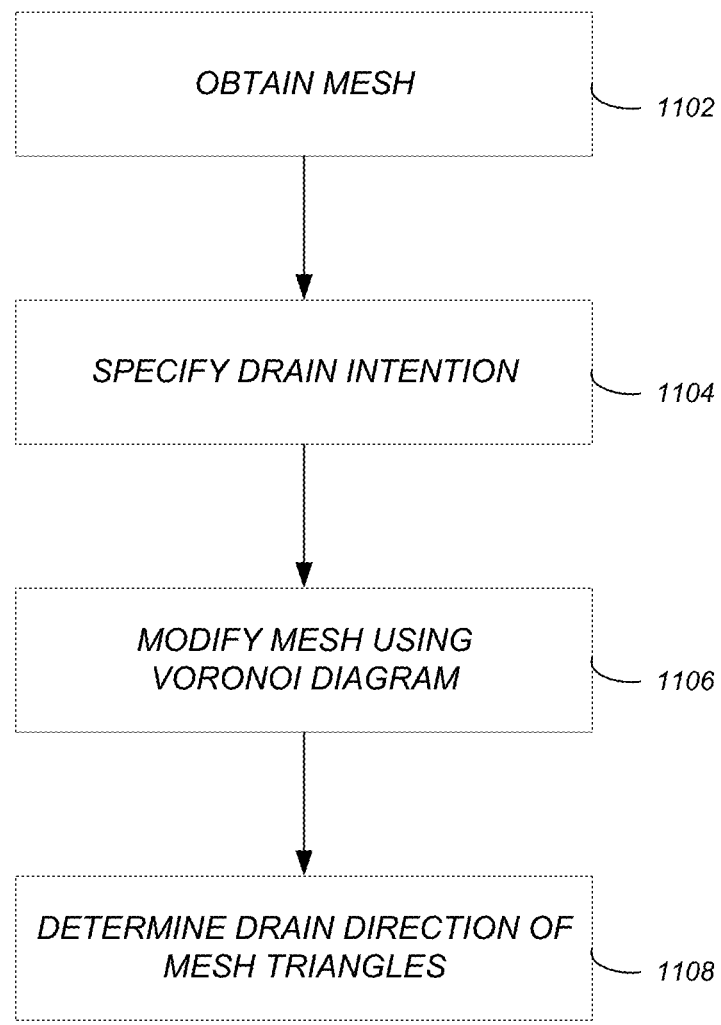
FIG. 11 illustrates an exemplary user definable zone hierarchy in accordance with one or more embodiments of the invention.

FIG. 11 illustrates an exemplary user definable zone hierarchy in accordance with one or more embodiments of the invention.

At step 1102, a triangular surface mesh is obtained/acquired in a computer. The mesh is representative of an existing surface and consists of two or more triangles that are connected by vertices and edges.

At step 1104, a drain intention is specified for the terrain surface through one or more geometries. Each of the one or more geometries is a point or a line. Further, the drain intention defines a drainage flow that influences a shape of the terrain surface. In one or more embodiments of the invention, the drain intention is specified by specifying a drain element type that may be a low point, a drain line, and/or a ridge line.

At step 1106, the triangular surface mesh is modified using a Voronoi diagram resulting in a modified triangular surface mesh. The Voronoi diagram is based on the one or more geometries. Further, the modifying prevents a drain conflict between the two or more triangles.

In one or more embodiments, the Voronoi diagram is an advanced Voronoi diagram. In such embodiments, the drain conflict is resolved by creating an advanced Voronoi diagram of the terrain using the one or more geometries based on lines or curves and consists of Voronoi cells. A surface mesh break line is placed along borders/intersections of the one or more Voronoi cells. The triangular surface mesh is then retriangulated along the placed break lines to result in the modified triangular surface mesh.

At step 1108, the system autonomously determines a drain direction of each of the two or more triangles in the modified triangular surface mesh based on the drain intention. The autonomous determination generates a drain pattern that is used to shape the terrain surface. The autonomous determination may consist of the determination of a geometry direction to a nearest geometry of (the one or more geometries) (e.g., based on the centroid of the geometry/triangle), followed by a determination of the drain direction based on the geometry direction and a drain intention type of the nearest geometry. As used herein, the autonomous determination is performed without and independent from additional user interaction/action/control.

As part of step 1108, the autonomous determination may include the use of zones (e.g., exclusive drainage zones). In such embodiments, one or more zones are identified that each include a subset of the one or more geometries. One of the zones is selected and a geometry direction (e.g., based on a centroid) to a nearest geometry (of the one or more geometries within the selected zone) is determined. Thereafter, the drain direction is determined based on the geometry direction and a drain intention type of the nearest geometry. The drain direction may also comply with a minimum (or maximum) slope constraint.

Further to the above, in the case of multiple zones, a zone hierarchy may be established/defined and used. For example, a first zone and second zone may be identified/defined where the first zone overlaps with the second zone. A hierarchy may then be defined that specifies a priority (e.g., that the first zone is a higher priority than the second zone such that settings of the first zone override settings of the second zone). A first geometry direction of the first zone and a second geometry direction of the second zone may be determined based on the hierarchy. Thereafter, the drain direction of each of the two or more triangles is determined based on the first geometry direction and the second geometry direction (which in turn is based on the hierarchy).

Step 1108 may also include the actual construction/building of the terrain surface based on the drain pattern.

Hardware Environment

Figure 12:
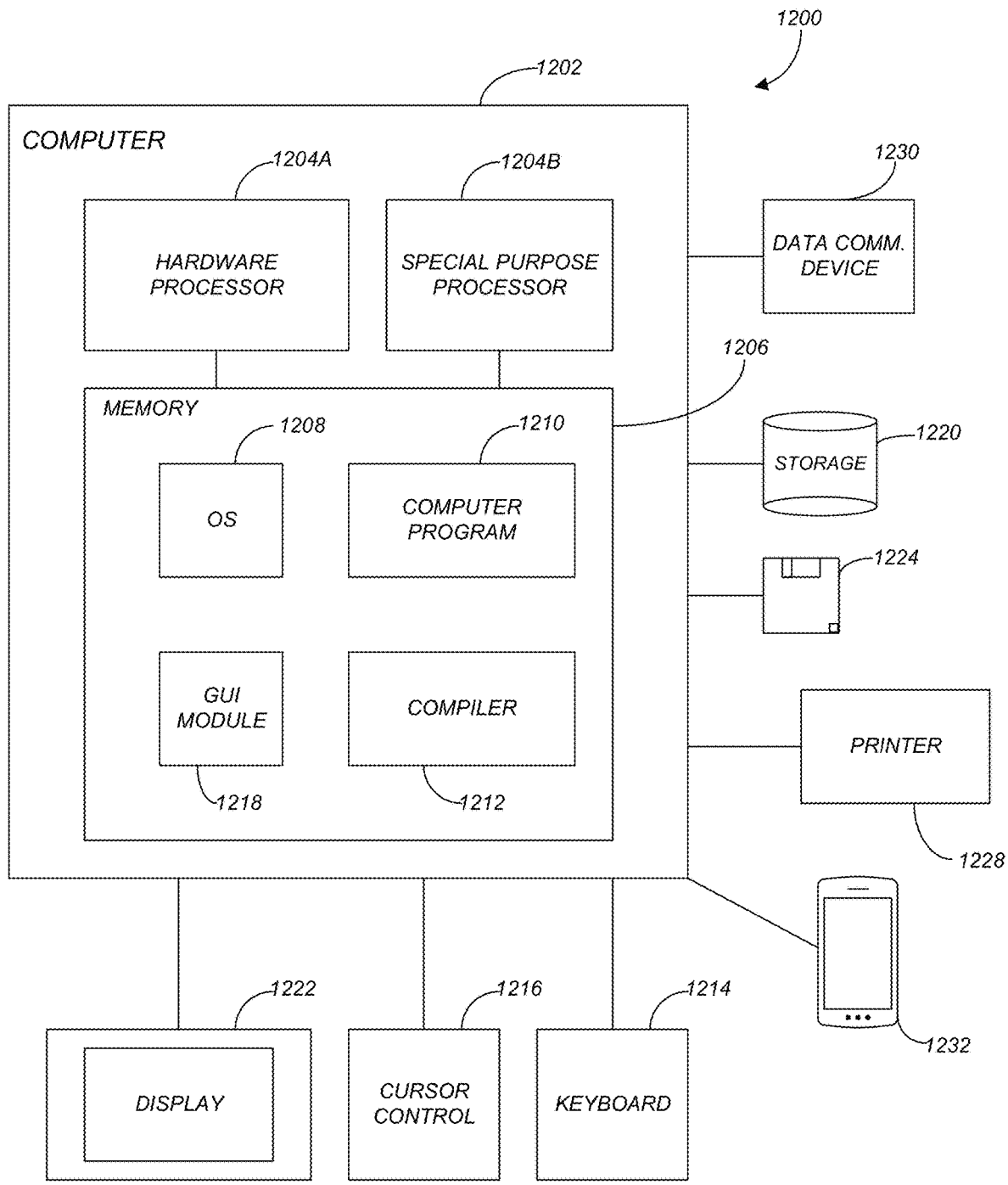
FIG. 12 is an exemplary hardware and software environment used to implement one or more embodiments of the invention.

FIG. 12 is an exemplary hardware and software environment 1200 (referred to as a computer-implemented system and/or computer-implemented method) used to implement one or more embodiments of the invention. The hardware and software environment includes a computer 1202 and may include peripherals. Computer 1202 may be a user/client computer, server computer, or may be a database computer. The computer 1202 comprises a hardware processor 1204A and/or a special purpose hardware processor 1204B (hereinafter alternatively collectively referred to as processor 1204) and a memory 1206, such as random access memory (RAM). The computer 1202 may be coupled to, and/or integrated with, other devices, including input/output (I/O) devices such as a keyboard 1214, a cursor control device 1216 (e.g., a mouse, a pointing device, pen and tablet, touch screen, multi-touch device, etc.) and a printer 1228. In one or more embodiments, computer 1202 may be coupled to, or may comprise, a portable or media viewing/listening device 1232 (e.g., an MP3 player, IPOD, NOOK, portable digital video player, cellular device, personal digital assistant, etc.). In yet another embodiment, the computer 1202 may comprise a multi-touch device, mobile phone, gaming system, internet enabled television, television set top box, or other internet enabled device executing on various platforms and operating systems.

In one embodiment, the computer 1202 operates by the hardware processor 1204A performing instructions defined by the computer program 1210 (e.g., a computer-aided design [CAD] application) under control of an operating system 1208. The computer program 1210 and/or the operating system 1208 may be stored in the memory 1206 and may interface with the user and/or other devices to accept input and commands and, based on such input and commands and the instructions defined by the computer program 1210 and operating system 1208, to provide output and results.

Output/results may be presented on the display 1222 or provided to another device for presentation or further processing or action. In one embodiment, the display 1222 comprises a liquid crystal display (LCD) having a plurality of separately addressable liquid crystals. Alternatively, the display 1222 may comprise a light emitting diode (LED) display having clusters of red, green and blue diodes driven together to form full-color pixels. Each liquid crystal or pixel of the display 1222 changes to an opaque or translucent state to form a part of the image on the display in response to the data or information generated by the processor 1204 from the application of the instructions of the computer program 1210 and/or operating system 1208 to the input and commands. The image may be provided through a graphical user interface (GUI) module 1218. Although the GUI module 1218 is depicted as a separate module, the instructions performing the GUI functions can be resident or distributed in the operating system 1208, the computer program 1210, or implemented with special purpose memory and processors.

In one or more embodiments, the display 1222 is integrated with/into the computer 1202 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 1202 according to the computer program 1210 instructions may be implemented in a special purpose processor 1204B. In this embodiment, some or all of the computer program 1210 instructions may be implemented via firmware instructions stored in a read only memory (ROM), a programmable read only memory (PROM) or flash memory within the special purpose processor 1204B or in memory 1206. The special purpose processor 1204B may also be hardwired through circuit design to perform some or all of the operations to implement the present invention. Further, the special purpose processor 1204B may be a hybrid processor, which includes dedicated circuitry for performing a subset of functions, and other circuits for performing more general functions such as responding to computer program 1210 instructions. In one embodiment, the special purpose processor 1204B is an application specific integrated circuit (ASIC).

The computer 1202 may also implement a compiler 1212 that allows an application or computer program 1210 written in a programming language such as C, C++, Assembly, SQL, PYTHON, PROLOG, MATLAB, RUBY, RAILS, HASKELL, or other language to be translated into processor 1204 readable code. Alternatively, the compiler 1212 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1210 accesses and manipulates data accepted from I/O devices and stored in the memory 1206 of the computer 1202 using the relationships and logic that were generated using the compiler 1212.

The computer 1202 also optionally comprises an external communication device such as a modem, satellite link, Ethernet card, or other device for accepting input from, and providing output to, other computers 1202.

In one embodiment, instructions implementing the operating system 1208, the computer program 1210, and the compiler 1212 are tangibly embodied in a non-transitory computer-readable medium, e.g., data storage device 1220, which could include one or more fixed or removable data storage devices, such as a zip drive, floppy disc drive 1224, hard drive, CD-ROM drive, tape drive, etc. Further, the operating system 1208 and the computer program 1210 are comprised of computer program 1210 instructions which, when accessed, read and executed by the computer 1202, cause the computer 1202 to perform the steps necessary to implement and/or use the present invention or to load the program of instructions into a memory 1206, thus creating a special purpose data structure causing the computer 1202 to operate as a specially programmed computer executing the method steps described herein. Computer program 1210 and/or operating instructions may also be tangibly embodied in memory 1206 and/or data communications devices 1230, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1202.

Figure 13:
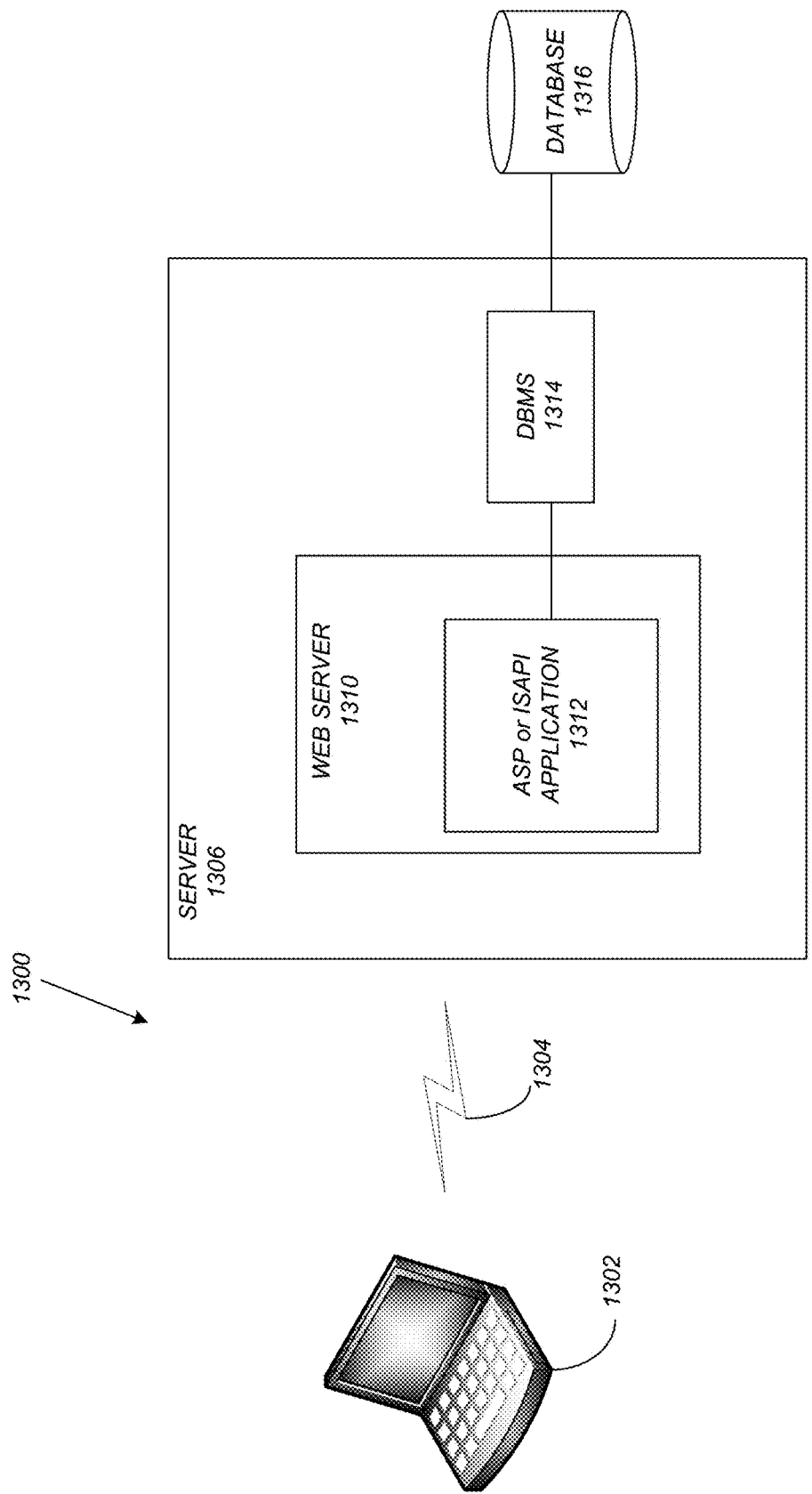
FIG. 13 schematically illustrates a typical distributed/cloud-based computer system in accordance with one or more embodiments of the invention.

FIG. 13 schematically illustrates a typical distributed/cloud-based computer system 1300 using a network 1304 to connect client computers 1302 to server computers 1306. A typical combination of resources may include a network 1304 comprising the Internet, LANs (local area networks), WANs (wide area networks), SNA (systems network architecture) networks, or the like, clients 1302 that are personal computers or workstations (as set forth in FIG. 12), and servers 1306 that are personal computers, workstations, minicomputers, or mainframes (as set forth in FIG. 12). However, it may be noted that different networks such as a cellular network (e.g., GSM [global system for mobile communications] or otherwise), a satellite based network, or any other type of network may be used to connect clients 1302 and servers 1306 in accordance with embodiments of the invention.

A network 1304 such as the Internet connects clients 1302 to server computers 1306. Network 1304 may utilize ethernet, coaxial cable, wireless communications, radio frequency (RF), etc. to connect and provide the communication between clients 1302 and servers 1306. Further, in a cloud-based computing system, resources (e.g., storage, processors, applications, memory, infrastructure, etc.) in clients 1302 and server computers 1306 may be shared by clients 1302, server computers 1306, and users across one or more networks. Resources may be shared by multiple users and can be dynamically reallocated per demand. In this regard, cloud computing may be referred to as a model for enabling access to a shared pool of configurable computing resources.

Clients 1302 may execute a client application or web browser and communicate with server computers 1306 executing web servers 1310. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 1302 may be downloaded from server computer 1306 to client computers 1302 and installed as a plug-in or ACTIVEX control of a web browser. Accordingly, clients 1302 may utilize ACTIVEX components/component object model (COM) or distributed COM (DCOM) components to provide a user interface on a display of client 1302. The web server 1310 is typically a program such as MICROSOFT'S INTERNET INFORMATION SERVER.

Web server 1310 may host an Active Server Page (ASP) or Internet Server Application Programming Interface (ISAPI) application 1312, which may be executing scripts. The scripts invoke objects that execute business logic (referred to as business objects). The business objects then manipulate data in database 1316 through a database management system (DBMS) 1314. Alternatively, database 1316 may be part of, or connected directly to, client 1302 instead of communicating/obtaining the information from database 1316 across network 1304. When a developer encapsulates the business functionality into objects, the system may be referred to as a component object model (COM) system. Accordingly, the scripts executing on web server 1310 (and/or application 1312) invoke COM objects that implement the business logic. Further, server 1306 may utilize MICROSOFT'S TRANSACTION SERVER (MTS) to access required data stored in database 1316 via an interface such as ADO (Active Data Objects), OLE DB (Object Linking and Embedding DataBase), or ODBC (Open DataBase Connectivity).

Generally, these components 1300-1316 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1302 and 1306 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1302 and 1306. Embodiments of the invention are implemented as a software/CAD application on a client 1302 or server computer 1306. Further, as described above, the client 1302 or server computer 1306 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for designing a terrain surface, comprising:
   (a) obtaining, in a computer, a triangular surface mesh representative of an existing surface, wherein the triangular surface mesh comprises two or more triangles that are connected by vertices and edges;
   (b) specifying a drain intention for the terrain surface through one or more geometries, wherein:
      (i) each of the one or more geometries comprises a point or a line; and
      (ii) the drain intention defines a drainage flow that influences a shape of the terrain surface;
   (c) modifying the triangular surface mesh using a Voronoi diagram resulting in a modified triangular surface mesh, wherein:
      (i) the Voronoi diagram is based on the one or more geometries; and
      (ii) the modifying prevents a drain conflict between the two or more triangles;
   (d) autonomously determining a drain direction of each of the two or more triangles in the modified triangular surface mesh based on the drain intention, wherein the autonomously determining generates a drain pattern that is used to shape the terrain surface.

2. The computer-implemented method of claim 1, wherein specifying the drain intention comprises:
   specifying a drain element type for one of the one or more geometries, wherein the drain element type comprises a low point.

3. The computer-implemented method of claim 1, wherein specifying the drain intention comprises:
   specifying a drain element type for one of the one or more geometries, wherein the drain element type comprises a drain line.

4. The computer-implemented method of claim 1, wherein specifying the drain intention comprises:
   specifying a drain element type for one of the one or more geometries, wherein the drain element type comprises a ridge line.

5. The computer-implemented method of claim 1, wherein autonomously determining the drain direction of each triangle comprises:
   determining a geometry direction to a nearest geometry of the one or more geometries;
   determining the drain direction based on the geometry direction and a drain intention type of the nearest geometry.

6. The computer-implemented method of claim 1, wherein autonomously determining the drain direction of each triangle comprises:
   identifying one or more zones, wherein each of the one or more zones include a subset of the one or more geometries;
   selecting one of the one or more zones;

determining a geometry direction to a nearest geometry, of the one or more geometries within the selected zone; and determining the drain direction based on the geometry direction and a drain intention type of the nearest geometry.

7. The computer-implemented method of claim 1, further comprising:

identifying one or more zones of the triangular surface mesh;

selecting one of the one or more zones;

determining a geometry direction of the selected zone; and determining the drain direction based on the geometry direction, wherein the drain direction complies with a minimum slope constraint.

8. The computer-implemented method of claim 1, further comprising resolving the drain conflict between the triangles by:

creating the Voronoi diagram of the terrain surface using the one or more geometries, wherein:
the Voronoi diagram comprises an advanced Voronoi diagram;
the advanced Voronoi diagram is based on lines or curves;
the Voronoi diagram comprises one or more Voronoi cells;

placing a surface mesh break line along borders of the one or more Voronoi cells in the Voronoi diagram; and retriangulating the triangular surface mesh along the placed break lines to result in the modified triangular surface mesh.

9. The computer-implemented method of claim 1, further comprising:

identifying a first zone and a second zone of the triangular surface mesh, wherein the first zone overlaps with the second zone;

defining a hierarchy for the first zone and the second zone, wherein:
the first zone is higher priority than the second zone;
settings of the first zone override settings of the second zone;

determining a first geometry direction of the first zone and a second geometry direction of the second zone based on the hierarchy; and determining the drain direction of each of the two or more triangles based on the first geometry direction and the second geometry direction.

10. The computer-implemented method of claim 1, further comprising:

building the terrain surface based on the drain pattern.

11. A computer-implemented system for designing a terrain surface, comprising:

(a) a computer having a memory;
(b) a processor executing on the computer;
(c) the memory storing a set of instructions, wherein the set of instructions, when executed by the processor cause the processor to perform operations comprising:
(i) obtaining a triangular surface mesh representative of an existing surface, wherein the triangular surface mesh comprises two or more triangles that are connected by vertices and edges;
(ii) specifying a drain intention for the terrain surface through one or more geometries, wherein:
(1) each of the one or more geometries comprises a point or a line; and
(2) the drain intention defines a drainage flow that influences a shape of the terrain surface;
(iii) modifying the triangular surface mesh using a Voronoi diagram resulting in a modified triangular surface mesh, wherein:
(1) the Voronoi diagram is based on the one or more geometries; and
(2) the modifying prevents a drain conflict between the two or more triangles;
(iv) autonomously determining a drain direction of each of the two or more triangles in the modified triangular surface mesh based on the drain intention, wherein the autonomously determining generates a drain pattern that is used to shape the terrain surface.

12. The computer-implemented system of claim 11, wherein the operations specifying the drain intention comprises:

specifying a drain element type for one of the one or more geometries, wherein the drain element type comprises a low point.

13. The computer-implemented system of claim 11, wherein the operations specifying the drain intention comprises:

specifying a drain element type for one of the one or more geometries, wherein the drain element type comprises a drain line.

14. The computer-implemented system of claim 11, wherein the operations specifying the drain intention comprises:

specifying a drain element type for one of the one or more geometries, wherein the drain element type comprises a ridge line.

15. The computer-implemented system of claim 11, wherein the operations autonomously determining the drain direction of each triangle comprises:

determining a geometry direction to a nearest geometry of the one or more geometries;

determining the drain direction based on the geometry direction and a drain intention type of the nearest geometry.

16. The computer-implemented system of claim 11, wherein the operations autonomously determining the drain direction of each triangle comprises:

identifying one or more zones, wherein each of the one or more zones include a subset of the one or more geometries;

selecting one of the one or more zones;

determining a geometry direction to a nearest geometry, of the one or more geometries within the selected zone; and determining the drain direction based on the geometry direction and a drain intention type of the nearest geometry.

17. The computer-implemented system of claim 11, wherein the operations further comprise:

identifying one or more zones of the triangular surface mesh;

selecting one of the one or more zones;

determining a geometry direction of the selected zone; and determining the drain direction based on the geometry direction, wherein the drain direction complies with a minimum slope constraint.

18. The computer-implemented system of claim 11, wherein the operations further comprise resolving the drain conflict between the triangles by:

creating the Voronoi diagram of the terrain surface using the one or more geometries, wherein:
  the Voronoi diagram comprises an advanced Voronoi diagram;
  the advanced Voronoi diagram is based on lines or curves;
  the Voronoi diagram comprises one or more Voronoi cells;
placing a surface mesh break line along borders of the one or more Voronoi cells in the Voronoi diagram; and
retriangulating the triangular surface mesh along the placed break lines to result in the modified triangular surface mesh.

19. The computer-implemented system of claim 11, wherein the operations further comprise:
  identifying a first zone and a second zone of the triangular surface mesh, wherein the first zone overlaps with the second zone;
  defining a hierarchy for the first zone and the second zone, wherein:
    the first zone is higher priority than the second zone;
    settings of the first zone override settings of the second zone;
  determining a first geometry direction of the first zone and a second geometry direction of the second zone based on the hierarchy; and
  determining the drain direction of each of the two or more triangles based on the first geometry direction and the second geometry direction.

20. The computer-implemented system of claim 11, further comprising:
  building the terrain surface based on the drain pattern.

* * * * *